United States Patent
Morris

(10) Patent No.: US 7,182,554 B1
(45) Date of Patent: Feb. 27, 2007

(54) DRYWALL RASP

(76) Inventor: Jeffrey R. Morris, 137 Earlygold St., McDonough, GA (US) 30253

( * ) Notice: Subject to any disclaimer, the term of this patent is extended or adjusted under 35 U.S.C. 154(b) by 0 days.

(21) Appl. No.: 11/203,597

(22) Filed: Aug. 15, 2005

(51) Int. Cl.
*B26D 1/12* (2006.01)
*B21K 5/12* (2006.01)

(52) U.S. Cl. .................... 407/29.1; 407/29.15

(58) Field of Classification Search ........... 407/29.1, 407/29.15, 29.12, 29.14; 76/88, 82, 83; D7/669, D7/678
See application file for complete search history.

(56) References Cited

U.S. PATENT DOCUMENTS

| | | | |
|---|---|---|---|
| 1,616,403 A | | 2/1927 | Womack |
| 1,955,848 A | * | 4/1934 | Dunn ................. 76/81.8 |
| 3,501,821 A | * | 3/1970 | Ford ................ 407/29.15 |
| 3,815,190 A | | 6/1974 | Russell et al. |
| 3,831,235 A | * | 8/1974 | Weninger ............ 407/29.1 |
| 4,099,310 A | * | 7/1978 | Mitchell ............ 407/29.13 |
| 4,281,460 A | | 8/1981 | Harris |
| 4,509,297 A | * | 4/1985 | Lindgren ............. 451/461 |
| 4,884,343 A | * | 12/1989 | Sewell .................. 30/169 |
| D372,413 S | | 8/1996 | Alam |
| 5,823,719 A | * | 10/1998 | Tyler ................. 407/29.1 |
| 5,997,221 A | * | 12/1999 | Sadler ............... 407/29.1 |
| D471,067 S | * | 3/2003 | Coburn et al. ......... D7/669 |
| 6,905,290 B1 | * | 6/2005 | Casciato, Jr. ....... 407/29.15 |
| 6,939,089 B1 | * | 9/2005 | Wickman ........... 407/29.15 |
| 6,957,934 B2 | * | 10/2005 | Masterson et al. ... 407/29.15 |

* cited by examiner

Primary Examiner—Willmon Fridie, Jr.

(57) ABSTRACT

A rasp includes a body including upper, lower, front and rear portions. The lower portion has a groove that has first and second sections extending along a length thereof. The first section includes equidistantly spaced coextensive cutting blades extending downwardly therefrom. The blades have front and rear surfaces that have a rectangular shape engageable along a portion of drywall. The second section includes randomly spaced protrusions that have arcuate shapes and extend downwardly therefrom. The protrusions are engageable with drywall for removing imperfections therefrom. A divider bifurcates the first and second sections and extends downwardly from the body. The divider has a height equal to that of the sidewalls. Coextensive sidewalls are conjoined with the body and oppositely spaced from the divider. The sidewalls protrude downwardly from the bottom surface and terminate coplanar with the divider. The first and second sections are recessed from the divider and the sidewalls.

15 Claims, 3 Drawing Sheets

DRYWALL RASP

CROSS REFERENCE TO RELATED APPLICATIONS

Not Applicable.

STATEMENT REGARDING FEDERALLY SPONSORED RESEARCH OR DEVELOPMENT

Not Applicable.

REFERENCE TO A MICROFICHE APPENDIX

Not Applicable.

BACKGROUND OF THE INVENTION

1. Technical Field

This invention relates to rasps and, more particularly, to a drywall rasp for smoothing the edges of a drywall panel at either a 45 or 90 degree angle.

2. Prior Art

Drywall, also known as wallboard, is made in part from gypsum and is supplied in the form of sheets which are then mounted to walls, ceilings and other structures to present an aesthetic, smooth surface. When sheets of drywall are being installed, it is often necessary to cut these sheets to size on the job. One common method of cutting drywall involves scoring the sheet with a sharp blade or other hand tool after which the sheet may actually be broken along the scored line by bending. The broken edge is invariably rough and must be smoothed prior to installation.

In order to smooth this rough edge, it is not uncommon for the artisan or drywall specialist to turn to the STANLEY® "Surform" rasp. However, this rasp is not specifically designed for the specific task at issue and is often employed for lack of a better device. The STANLEY® rasp is much larger than necessary for the job, is bulky and often slips off the rough cut edge of the drywall when in use. Furthermore, the replacement blades for this tool are expensive and require the use of a screwdriver for installation and removal.

Another implement that is widely utilized commercially for removing material from a cut edge of wallboard is an article known as a wallboard rasp. A conventional wallboard rasp is formed of two major components, namely a handle and an abrading element. The handle is often fabricated from wood as a generally rectangular block, typically about six or seven inches in length, about two inches in width and one inch in thickness. A shallow trough is formed lengthwise down the center of the underside of the block while a pair of longitudinally extending narrow slots or crevices are formed along the sides of the block. The crevices are designed to receive the longitudinal edges of the abrading element.

Conventional wallboard rasps perform their intended function quite adequately. However, they are also the source of many painful injuries. Since the expanded metal abrasive element is wrapped over the outer edges of a supporting block, there is a considerable exposure of sharp surface area that creates painful injuries with only light contact to the skin of a user. As a consequence, users must proceed slowly and carefully when utilizing this implement, which increases the amount of time needed to complete the installation of the drywall. Even so, many injuries result.

Furthermore, the transversely cut ends of the expanded metal present an additional source of injury. While the sheet of expanded metal forming the abrasive element is normally cut to a length slightly shorter than the supporting wooden block that serves as a handle so that the ends of the wooden block extend longitudinally beyond the ends of the expanded metal abrading element, the ends of the abrading element are still quite dangerous. This results from cutting the sheet of expanded metal to size.

When the strips of metal that form the lattice to create a multiplicity of grid openings in the expanded metal are cut, short barbs are left that project outwardly at the cut ends of the expanded metal sheet. These barbs can sometimes become bent forwardly and project beyond the end of the underside of the wooden block handle. This exposure creates a considerable safety hazard. The ends can be capped with a folded over marginal strip of metal which is spot welded to encase therein the cut barbs at the ends of the sheet of expanded metal. However, this adds to the cost of fabrication of the product.

A further shortcoming of the implements described herein above is the fact that they can only b used to smooth a rough surface to a flat 90 degree angle. Thus, when to pieces of drywall are conjoined at a corner one piece is cut a slightly shorter than the other such that the longer piece will overlap the shorter one upon installation. This, unfortunately, results in an unsightly section of gypsum being exposed. It would be advantageous to shape two corner sheets in a manner that allows them to be installed without one piece overlapping the other.

Accordingly, a need remains for a drywall rasp in order to overcome the above-noted shortcomings. The present invention satisfies such a need by providing a rasp that is easy and convenient to use, lightweight and compact in design, safe to use and reasonably priced. Such a drywall rasp advantageously allows a user to smooth rough edges to either a 45 or a 90 degree angle depending on where the sheets of drywall are installed. Drywall contractors, along with do-it-yourself enthusiasts, find this new design for a drywall rasp quite helpful, in that it can be used in all situations.

BRIEF SUMMARY OF THE INVENTION

In view of the foregoing background, it is therefore an object of the present invention to provide a drywall rasp. These and other objects, features, and advantages of the invention are provided by a drywall rasp for smoothing the edges of a drywall panel at either a 45 or 90 degree angle.

The rasp includes a body including upper and lower portions. Such a lower portion has a groove formed therein that has coextensive first and second sections extending along an entire length thereof. The upper portion of the body preferably includes first and second textured surfaces for advantageously and effectively assisting a user in maintaining a grip thereof. Such a first textured surface extends along a major portion of the upper portion and has a coarse index smaller than a coarse index of the second textured surface. The second textured surface is spaced rearwardly from the first textured surface and slopes upwardly from the upper portion of the body. The second textured surface has a surface area less than the surface area of the first textured surface.

The body further has front and rear portions. Such a front section may include an arcuately shaped nose portion for conveniently assisting a user in smoothing edges of drywall. The front section preferably further includes a plurality of coextensive and monolithically formed recesses equidistantly spaced from the longitudinal axis. Such recesses are sized and shaped for effectively and conveniently receiving a user's hand. The recesses extend downwardly from a top surface of the front section and terminate above the bottom surface of the body. The rear section may have a concave surface that slopes upwardly from a top surface of the rear section. The second textured surface is contiguous with the concave surface.

The first section includes a plurality of juxtaposed and equidistantly spaced coextensive cutting blades extending downwardly and obliquely from a bottom surface of the body and along a partial length thereof. Such blades extend across an entire width of the first section and define a hypotenuse of a right triangle defined with one of the sidewalls and the bottom surface. The blades are directly engageable along a portion of drywall for smoothing the edges thereof to a 45 degree angle.

The second section includes a plurality of randomly spaced protrusions that have an arcuate shape and extend downwardly from the bottom surface of the lower portion along a partial length of the body. Such protrusions are directly engageable along a portion of drywall for removing undesirable imperfections therefrom.

A divider member bifurcates the first and second sections and extends downwardly and orthogonally from the body such that the first and second sections become isolated during operating conditions. Such a divider member has a height equal to the height of the sidewalls.

A plurality of coextensive sidewalls are directly conjoined with the body and oppositely spaced from the divider member. Such sidewalls protrude downwardly from the bottom surface and terminate at a selected distance which is coplanar with the divider member. The first and second sections are recessed from the divider member and the sidewalls.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

It is noted the purpose of the foregoing abstract is to enable the U.S. Patent and Trademark Office and the public generally, especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

BRIEF DESCRIPTION OF THE SEVERAL VIEWS OF THE DRAWING

The novel features believed to be characteristic of this invention are set forth with particularity in the appended claims. The invention itself, however, both as to its organization and method of operation, together with further objects and advantages thereof, may best be understood by reference to the following description taken in connection with the accompanying drawings in which:

DETAILED DESCRIPTION OF THE INVENTION

Figure 1:
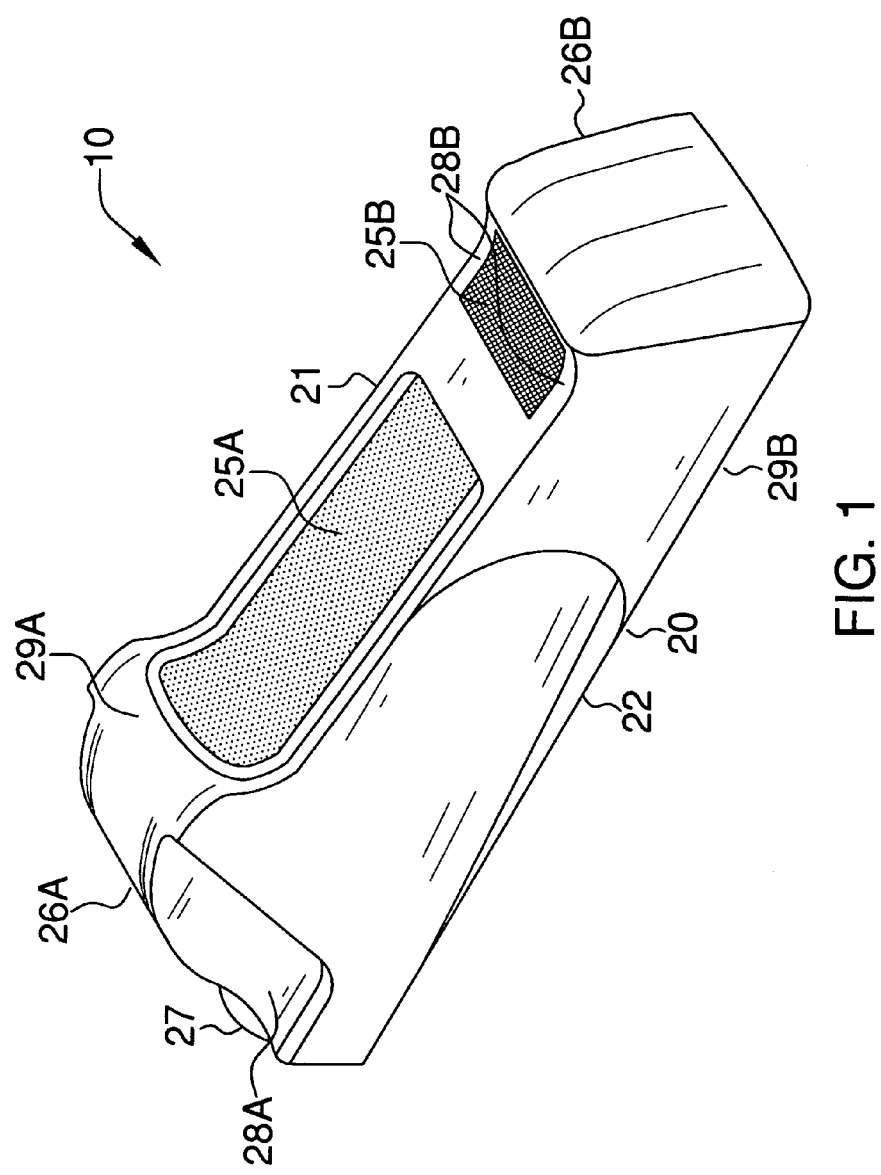
FIG. 1 is a top perspective view showing a drywall rasp, in accordance with the present invention.

The present invention will now be described more fully hereinafter with reference to the accompanying drawings, in which a preferred embodiment of the invention is shown. This invention may, however, be embodied in many different forms and should not be construed as limited to the embodiment set forth herein. Rather, this embodiment is provided so that this application will be thorough and complete, and will fully convey the true scope of the invention to those skilled in the art. Like numbers refer to like elements throughout the figures.

The apparatus of this invention is referred to generally in FIGS. 1–4 by the reference numeral 10 and is intended to provide a drywall rasp. It should be understood that the apparatus 10 may be used to smooth and angle many different types of sheeted material and should not be limited in use to only drywall.

Figure 2:
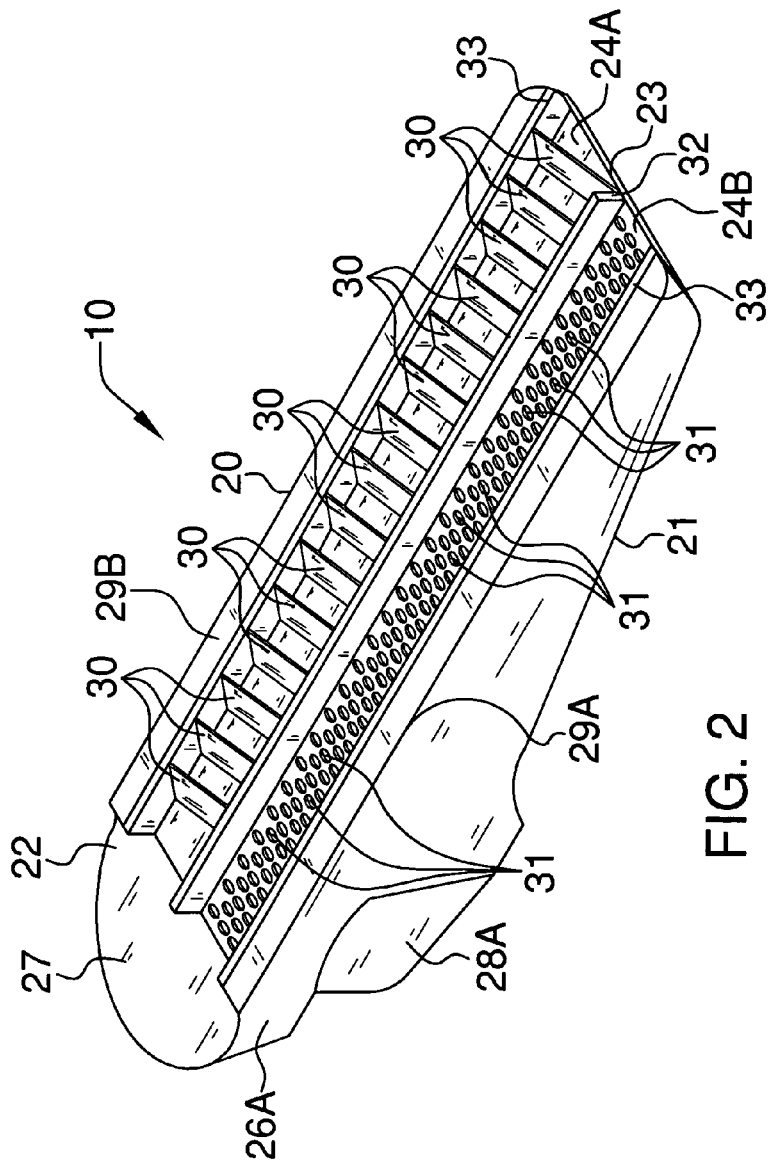
FIG. 2 is a bottom perspective view of the apparatus shown in FIG. 1.

Referring initially to FIGS. 1 and 2, the apparatus 10 includes a body 20 including upper 21 and lower 22 portions. Such a lower portion 22 has a groove 23 formed therein that has coextensive first 24A and second 24B sections extending along an entire length thereof. The upper portion 21 of the body 20 includes first 25A and second 25B textured surfaces that are essential for advantageously and effectively assisting a user in maintaining a grip thereof. This advantageously prevents untimely slippage of the apparatus 10, which in turn reduces the chance of an operator incurring an injury from the cutting blades 30 (described herein below). Such a first textured surface 25A extends along a major portion of the upper portion 21 and has a coarse index smaller than a coarse index of the second textured surface 25B. The second textured surface 25B is spaced rearwardly from the first textured surface 25A and slopes upwardly from the upper portion 21 of the body 20. The second textured surface 25B has a surface area less than the surface area of the first textured surface 25A. Of course, the first 25A and second 25B textured surfaces may be alternately sized, shaped and positioned along the body 20, as is obvious to a person of ordinary skill in the art.

Figure 3:
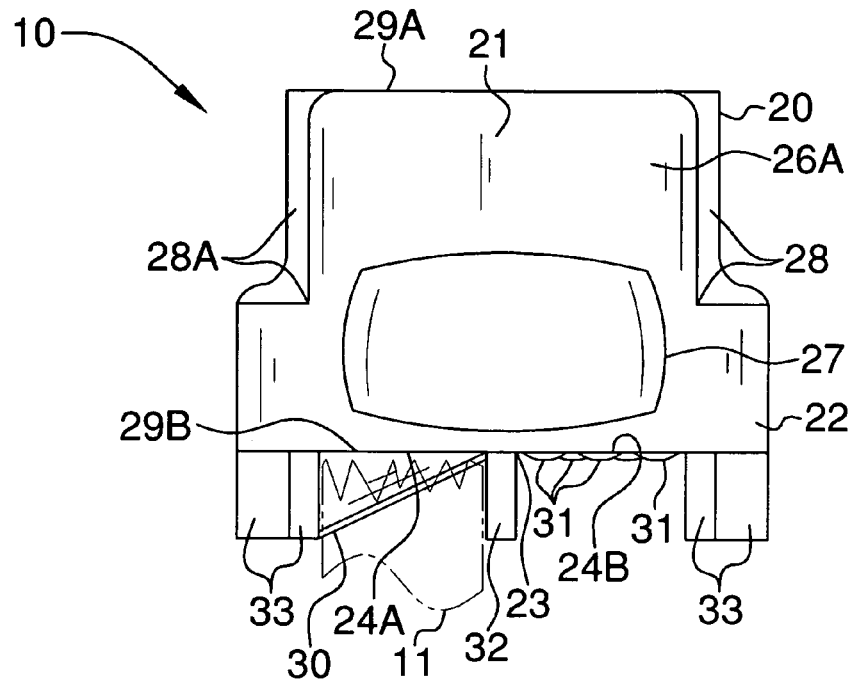
FIG. 3 is a front-elevational view of the apparatus shown in FIG. 2, showing the drywall positioned along the first section for forming a 45 degree angle.
Figure 4:
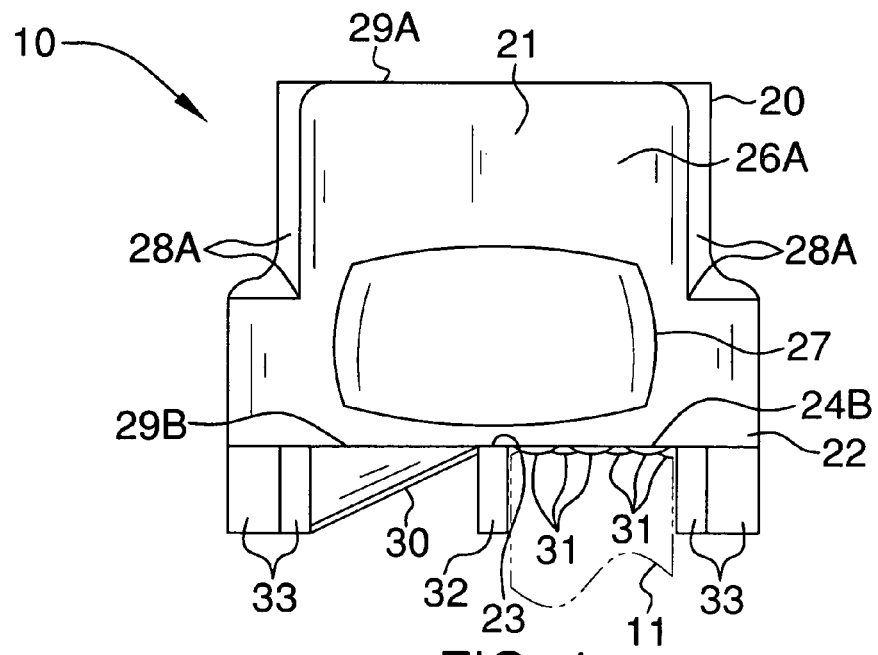
FIG. 4 is a front-elevational view of the apparatus shown in FIG. 3, showing the drywall positioned along the second section for forming a 90 degree angle.

Referring to FIGS. 1, 3 and 4, the body 20 further has front 26A and rear 26B portions. Such a front portion 26A includes an arcuately shaped nose portion 27 that is crucial for conveniently assisting a user in smoothing edges of drywall 11. The front portion 26A further includes a plurality of coextensive and monolithically formed recesses 28A equidistantly spaced from the longitudinal axis. Such recesses 28A are sized and shaped for effectively and conveniently receiving a user's hand. The recesses 28A extend downwardly from a top surface 29A of the front portion 26A and terminate above the bottom surface 29B of the body 20. The rear portion 26B has a concave surface 28B that slopes upwardly from a top surface 29A of the rear portion 26B. The second textured surface 25B is contiguous with the concave surface 28B.

Referring to FIGS. 2 through 4, the first section 24A includes a plurality of juxtaposed and equidistantly spaced coextensive cutting blades 30 extending downwardly and obliquely from a bottom surface 29B of the body 20 and along a partial length thereof. Such blades 30 extend across an entire width of the first section 24A and define a hypotenuse of a right triangle defined with one of the sidewalls 33

(described herein below) and the bottom surface 29B. The blades 30 are directly engageable along a portion of drywall 11 for smoothing the edges thereof to a 45 degree angle. This is a convenient and advantageous feature for properly and neatly installing sections of drywall 11 along walls, ceilings and other appropriate surfaces. Of course, the cutting blades 30 may be positioned at alternate angles other than 45 degrees, as is obvious to a person of ordinary skill in the art.

Still referring to FIGS. 2 through 4, the second section 24B includes a plurality of randomly spaced protrusions 31 that have an arcuate shape and extend downwardly from the bottom surface 29B of the lower portion 22 along a partial length of the body 20. Such protrusions 31 are directly engageable, with no intervening elements, along a portion of drywall 11, which is vital and advantageous for effectively removing undesirable imperfections therefrom and for smoothing the edges thereof to a 90 degree angle.

Again referring to FIGS. 2 through 4, a divider member 32 bifurcates the first 24A and second 24B sections and extends downwardly and orthogonally from the body 20 such that the first 24A and second 24B sections become isolated during operating conditions. This feature is important for allowing a user to use one section 24 independently from another section 24 during operating conditions. Such a divider member 32 has a height equal to the height of the sidewalls 33.

Yet again referring to FIGS. 2 through 4, a plurality of coextensive sidewalls 33 are directly conjoined, with no intervening elements, with the body 20 and oppositely spaced from the divider member 32. Such sidewalls 33 protrude downwardly from the bottom surface 29B and terminate at a selected distance which is coplanar with the divider member 32. The first 24A and second 24B sections are recessed from the divider member 32 and the sidewalls 33. This feature is convenient and critical for providing a barrier that advantageously prevents the apparatus 10 from slipping off of the section of drywall 11 during operating conditions, thus ensuring a final product with a professional appearance.

While the invention has been described with respect to a certain specific embodiment, it will be appreciated that many modifications and changes may be made by those skilled in the art without departing from the spirit of the invention. It is intended, therefore, by the appended claims to cover all such modifications and changes as fall within the true spirit and scope of the invention.

In particular, with respect to the above description, it is to be realized that the optimum dimensional relationships for the parts of the present invention may include variations in size, materials, shape, form, function and manner of operation. The assembly and use of the present invention are deemed readily apparent and obvious to one skilled in the art.

What is claimed as new and what is desired to secure by Letters Patent of the United States is:

1. A drywall rasp for smoothing the edges of a drywall panel at either a 45 or 90 degree angle, said rasp comprising:
   a body including upper and lower portions, said lower portion having a groove formed therein, the groove having first and second sections extending along an entire length thereof, said body further having front and rear portions;
   wherein said first section includes a plurality of juxtaposed and equidistantly spaced coextensive cutting blades extending downwardly and obliquely from a bottom surface of said body and along a partial length thereof, said blades extending across an entire width of said first section and defining a hypotenuse of a right triangle defined with one said sidewalls and said bottom surface, said blades being directly engageable along a portion of drywall for smoothing the edges thereof to a 45 degree angle;
   wherein said second section includes a plurality of randomly spaced protrusions having an arcuate shape and extending downwardly from said bottom surface of said lower portion along a partial length of said body, said protrusions being directly engageable along a portion of drywall for removing undesirable imperfections therefrom;
   a divider member bifurcating said first and second sections and extending downwardly and orthogonally from said body such that said first and second sections become isolated during operating conditions; and
   a plurality of sidewalls directly conjoined with said body and oppositely spaced from said divider member, said sidewalls protruding downwardly from said bottom surface and terminating at a selected distance which is coplanar with said divider member;
   wherein said first and second sections are recessed from said divider member and said sidewalls.

2. The rasp of claim 1, wherein said upper portion of said body includes first and second textured surfaces for assisting a user in maintaining a grip thereof, said first textured surface extending along a major portion of said upper portion having a coarse index smaller than a coarse index of said second textured surface, said second textured surface being spaced rearwardly from said first textured surface and sloping upwardly from said upper portion of said body, said second textured surface having a surface area less than the surface area of said first textured surface.

3. The rasp of claim 1, wherein said front section includes an arcuately shaped nose portion for assisting a user in smoothing edges of drywall.

4. The rasp of claim 1, wherein said front section further includes a plurality of coextensive and monolithically formed recesses equidistantly spaced from the longitudinal axis, the recesses being sized and shaped for receiving a user's hand, the recesses extending downwardly from a top surface of said front section and terminating above said bottom surface of said body.

5. The rasp of claim 1, wherein said rear section has a concave surface sloping upwardly from a top surface of said rear section, said second textured surface being contiguous with said concave surface.

6. A drywall rasp for smoothing the edges of a drywall panel at either a 45 or 90 degree angle, said rasp comprising:
   a body including upper and lower portions, said lower portion having a groove formed therein, the groove having first and second sections extending along an entire length thereof, said body further having front and rear portions;
   wherein said first section includes a plurality of juxtaposed and equidistantly spaced coextensive cutting blades extending downwardly and obliquely from a bottom surface of said body and along a partial length thereof, said blades extending across an entire width of said first section and defining a hypotenuse of a right triangle defined with one said sidewalls and said bottom surface, said blades being directly engageable along a portion of drywall for smoothing the edges thereof to a 45 degree angle;
   wherein said second section includes a plurality of randomly spaced protrusions having an arcuate shape and extending downwardly from said bottom surface of said lower portion along a partial length of said body, said protrusions being directly engageable along a portion of drywall for removing undesirable imperfections therefrom;

a divider member bifurcating said first and second sections and extending downwardly and orthogonally from said body such that said first and second sections become isolated during operating conditions, said divider member having a height equal to the height of said sidewalls; and a plurality of sidewalls directly conjoined with said body and oppositely spaced from said divider member, said sidewalls protruding downwardly from said bottom surface and terminating at a selected distance which is coplanar with said divider member;

wherein said first and second sections are recessed from said divider member and said sidewalls.

7. The rasp of claim 6, wherein said upper portion of said body includes first and second textured surfaces for assisting a user in maintaining a grip thereof, said first textured surface extending along a major portion of said upper portion having a coarse index smaller than a coarse index of said second textured surface, said second textured surface being spaced rearwardly from said first textured surface and sloping upwardly from said upper portion of said body, said second textured surface having a surface area less than the surface area of said first textured surface.

8. The rasp of claim 6, wherein said front section includes an arcuately shaped nose portion for assisting a user in smoothing edges of drywall.

9. The rasp of claim 6, wherein said front section further includes a plurality of coextensive and monolithically formed recesses equidistantly spaced from the longitudinal axis, the recesses being sized and shaped for receiving a user's hand, the recesses extending downwardly from a top surface of said front section and terminating above said bottom surface of said body.

10. The rasp of claim 6, wherein said rear section has a concave surface sloping upwardly from a top surface of said rear section, said second textured surface being contiguous with said concave surface.

11. A drywall rasp for smoothing the edges of a drywall panel at either a 45 or 90 degree angle, said rasp comprising:

a body including upper and lower portions, said lower portion having a groove formed therein, the groove having coextensive first and second sections extending along an entire length thereof, said body further having front and rear portions;

wherein said first section includes a plurality of juxtaposed and equidistantly spaced coextensive cutting blades extending downwardly and obliquely from a bottom surface of said body and along a partial length thereof, said blades extending across an entire width of said first section and defining a hypotenuse of a right triangle defined with one said sidewalls and said bottom surface, said blades being directly engageable along a portion of drywall for smoothing the edges thereof to a 45 degree angle;

wherein said second section includes a plurality of randomly spaced protrusions having an arcuate shape and extending downwardly from said bottom surface of said lower portion along a partial length of said body, said protrusions being directly engageable along a portion of drywall for removing undesirable imperfections therefrom;

a divider member bifurcating said first and second sections and extending downwardly and orthogonally from said body such that said first and second sections become isolated during operating conditions, said divider member having a height equal to the height of said sidewalls; and a plurality of coextensive sidewalls directly conjoined with said body and oppositely spaced from said divider member, said sidewalls protruding downwardly from said bottom surface and terminating at a selected distance which is coplanar with said divider member;

wherein said first and second sections are recessed from said divider member and said sidewalls.

12. The rasp of claim 11, wherein said upper portion of said body includes first and second textured surfaces for assisting a user in maintaining a grip thereof, said first textured surface extending along a major portion of said upper portion having a coarse index smaller than a coarse index of said second textured surface, said second textured surface being spaced rearwardly from said first textured surface and sloping upwardly from said upper portion of said body, said second textured surface having a surface area less than the surface area of said first textured surface.

13. The rasp of claim 11, wherein said front section includes an arcuately shaped nose portion for assisting a user in smoothing edges of drywall.

14. The rasp of claim 11, wherein said front section further includes a plurality of coextensive and monolithically formed recesses equidistantly spaced from the longitudinal axis, the recesses being sized and shaped for receiving a user's hand, the recesses extending downwardly from a top surface of said front section and terminating above said bottom surface of said body.

15. The rasp of claim 11, wherein said rear section has a concave surface sloping upwardly from a top surface of said rear section, said second textured surface being contiguous with said concave surface, said first and second sections being coextensive.

* * * * *